United States Patent
Mizukami et al.

(10) Patent No.: US 11,786,960 B2
(45) Date of Patent: Oct. 17, 2023

(54) METHOD FOR MANUFACTURING STABILIZER

(71) Applicant: NHK SPRING Co., Ltd., Yokohama (JP)

(72) Inventors: Hiroshi Mizukami, Yokohama (JP); Masato Inaba, Yokohama (JP); Masato Sugawara, Yokohama (JP); Michiya Masuda, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 35 days.

(21) Appl. No.: 17/439,583

(22) PCT Filed: Mar. 12, 2020

(86) PCT No.: PCT/JP2020/010692
§ 371 (c)(1),
(2) Date: Sep. 15, 2021

(87) PCT Pub. No.: WO2020/189469
PCT Pub. Date: Sep. 24, 2020

(65) Prior Publication Data
US 2022/0152689 A1     May 19, 2022

(30) Foreign Application Priority Data
Mar. 18, 2019 (JP) .................. 2019-049321

(51) Int. Cl.
*B21K 1/06* (2006.01)
*B60G 21/02* (2006.01)

(52) U.S. Cl.
CPC .............. *B21K 1/06* (2013.01); *B60G 21/026* (2013.01)

(58) Field of Classification Search
CPC . B21K 1/06; B21K 1/12; B21K 1/766; B21K 21/12; B21K 21/14; B21D 53/88
See application file for complete search history.

(56) References Cited

U.S. PATENT DOCUMENTS

| | | | |
|---|---|---|---|
| 6,547,894 B1 * | 4/2003 | Smith | B60G 21/055 228/248.1 |
| 2005/0011591 A1 | 1/2005 | Murty et al. | |

(Continued)

FOREIGN PATENT DOCUMENTS

| | | |
|---|---|---|
| CN | 1721102 A | 1/2006 |
| CN | 102164760 A | 8/2011 |

(Continued)

OTHER PUBLICATIONS

EPO Extended European Search Report for corresponding EP Application No. 20774014.3; dated Nov. 11, 2022.

(Continued)

*Primary Examiner* — Debra M Sullivan
(74) *Attorney, Agent, or Firm* — CANTOR COLBURN LLP

(57) ABSTRACT

A method for manufacturing a stabilizer, the stabilizer including a main body bar that is elastically deformable, and a pair of connecting plates that are separately connected to a pair of left and right suspension devices, the method including a forging step of forming the connecting plate by forging both end portions of a material tube, in which in the forging step, both end portions of the material tube are crushed in a radial direction to be formed into the connecting plate in a state where a sealing metal plate heated to a temperature equal to or higher than a melting point is disposed inside both end portions of the material tube heated to a temperature lower than the melting point.

7 Claims, 3 Drawing Sheets

(56) References Cited

U.S. PATENT DOCUMENTS

| | | |
|---|---|---|
| 2005/0011592 A1 | 1/2005 | Smith |
| 2007/0216126 A1 | 9/2007 | Lopez et al. |
| 2012/0258329 A1 | 10/2012 | Tanabe |

FOREIGN PATENT DOCUMENTS

| | | | |
|---|---|---|---|
| CN | 204228280 U | 3/2015 | |
| CN | 106061639 A | 10/2016 | |
| CN | 107023737 A | 8/2017 | |
| CN | 107457343 A | 12/2017 | |
| CN | 108290204 A | 7/2018 | |
| DE | 102005019469 A1 | 11/2006 | |
| EP | 3369593 A1 * | 9/2018 | ........... B29C 44/188 |
| EP | 3369593 A1 | 9/2018 | |
| GB | 317720 A | 7/1930 | |
| JP | S62240131 A | 10/1987 | |
| JP | H07237428 A | 9/1995 | |
| JP | 2007320343 A | 12/2007 | |
| JP | 2007320343 A * | 12/2007 | |
| JP | 2007320344 A | 12/2007 | |
| JP | 2007320407 A | 12/2007 | |
| JP | 2007320408 A | 12/2007 | |
| JP | 2008143313 A | 6/2008 | |
| JP | 2009226410 A | 10/2009 | |
| JP | 4798674 B1 | 10/2011 | |
| JP | 2013091433 A | 5/2013 | |

OTHER PUBLICATIONS

International Search Report for International Application No. PCT/JP2020/010692; dated Apr. 14, 2020.

CNIPA Search Report for corresponding CN Application No. 202080019660.8; dated Dec. 1, 2022.

CNIPA Search Report for corresponding CN Application No. 202080019660.8; dated Jun. 9, 2023.

\* cited by examiner

METHOD FOR MANUFACTURING STABILIZER

CROSS REFERENCE TO RELATED APPLICATIONS

This is the U.S. national stage of application No. PCT/JP2020/010692, filed on Mar. 12, 2020. Priority under 35 U.S.C. § 119(a) and 35 U.S.C. § 365(b) is claimed from Japanese Application No. 2019-049321, filed Mar. 18, 2019, the disclosure of which is also incorporated herein by reference.

TECHNICAL FIELD

The present invention relates to a method for manufacturing a stabilizer.

Priority is claimed on Japanese Patent Application No. 2019-049321, filed on Mar. 18, 2019, the content of which is incorporated herein by reference.

BACKGROUND ART

Conventionally, as a method for manufacturing a stabilizer, the stabilizer including a main body bar that is elastically deformable, and a pair of connecting plates that are separately connected to a pair of left and right suspension devices, there has been known a method including a forging step of forming the connecting plate by forging both end portions of a material tube. In the forging step, the connecting plate is formed by crushing an end portion of the material tube in a radial direction and forming an inner peripheral surface of the material tube so as to have a set of flat inner surfaces.

As a method for manufacturing this type of stabilizer, for example, as shown in Patent Document 1 below, there is known a method in which a cylindrical insert material is separately fitted in both end portions of the material tube, and then both end portions of the material tube are forged to form the connecting plate.

According to this method, both end portions of the material tube are crushed in the radial direction together with the insert material in the forging step. Therefore, it is possible to spread the insert material over the entire area between the above-described set of inner surfaces, and it is possible to suppress an opening of pores communicating with the inside of the main body bar on an end surface of the connecting plate. This makes it possible to prevent rust from being generated on the inner peripheral surface of the main body bar, for example.

CITATION LIST

Patent Document

[Patent Document 1]
Japanese Unexamined Patent Application, First Publication No. 2007-320343

SUMMARY OF INVENTION

Technical Problem

In the conventional method for manufacturing the stabilizer, since both end portions of the material tube are crushed together with a cylindrical insert material in the radial direction to be formed into the connecting plate in the forging step, workability is deteriorated, for example, by requiring a large pressing force and the like, and there is a possibility that the size of the connecting plate becomes larger than the current one.

The present invention has been made in consideration of such circumstances, and an object of the present invention is to provide a method for manufacturing a stabilizer capable of suppressing an opening of pores communicating with the inside of a main body bar on an end surface of a connecting plate while maintaining workability and a size of the connecting plate at the same level as at the current one.

Solution to Problem

The first aspect of the present invention is a method for manufacturing a stabilizer including a main body bar that is elastically deformable, and a pair of connecting plates that are separately connected to a pair of left and right suspension devices, the method including a forging step of forming the connecting plate by forging both end portions of a material tube, in which in the forging step, both end portions of the material tube are crushed in a radial direction to be formed into the connecting plate in a state where a sealing metal plate heated to a temperature equal to or higher than a melting point is disposed inside both end portions of the material tube heated to a temperature lower than the melting point.

According to the first aspect of the present invention, in the forging step, both end portions of the material tube are crushed in a radial direction to be formed into the connecting plate in a state where a sealing metal plate heated to a temperature equal to or higher than a melting point is disposed inside both end portions of the material tube. Therefore, the sealing metal plate is likely to extend in a direction orthogonal to a direction in which the end portion of the material tube is crushed in the forging step when viewed from the direction along the central axis of the end portion of the material tube. Accordingly, in the forging step, when the end portion of the material tube is crushed in the radial direction, the sealing metal plate can be spread over the entire area between a set of flat inner surfaces that the inner peripheral surface of the end portion of the material tube has. As a result, it is possible to reliably suppress the opening of the pores communicating with the inside of the main body bar on the end surface of the connecting plate.

According to the first aspect of the present invention, the insert material disposed in both end portions of the material tube in the forging step is a sealing metal plate, which is a metal plate material. Therefore, in combination with the fact that the plate material is softened by being heated to the temperature equal to or higher than the melting point, it is possible to greatly reduce the pressing force required for forming the end portion of the material tube into the connecting plate as compared with the case where the cylindrical insert material is fitted into both end portions of the material tube as in the conventional case, thereby preventing the deterioration of workability.

According to the first aspect of the present invention, the sealing metal plate is arranged between a set of flat inner surfaces of the connecting plate. Therefore, it is possible to reliably prevent the connecting plate from being deformed such that a set of inner surfaces is separated from each other in a post-step such as drilling of the connecting plate after the forging step.

According to the second aspect of the present invention, in the first aspect, a melting point of a material of the material tube is higher than a melting point of a material of the sealing metal plate, and in the forging step, both end portions of the material tube and the sealing metal plate are integrally heated at the temperature lower than the melting point of the material of the material tube and equal to or higher than the melting point of the material of the sealing metal plate in a state where the sealing metal plate is disposed inside both end portions of the material tube.

According to the second aspect of the present invention, the melting point of the material of the material tube is higher than the melting point of the material of the sealing metal plate. Therefore, in the forging step, both end portions of the material tube and the sealing metal plate are integrally heated in a state where the sealing metal plate is disposed inside both end portions of the material tube, such that the temperature of both end portions of the material tube can be made lower than the melting point and the temperature of the sealing metal plate can be made equal to or higher than the melting point, thereby enhancing the manufacturing efficiency.

For example, in a case where the melting point of the material of the material tube is equal to or lower than the melting point of the material of the sealing metal plate, in order to make the temperature of both end portions of the material tube lower than the melting point and make the temperature of the sealing metal plate equal to or higher than the melting point in the forging step, first, the sealing metal plate is heated in advance to a temperature at least higher than both end portions of the material tube. It is necessary to heat both end portions of the material tube and the sealing metal plate integrally by disposing the sealing metal plate in both end portions of the material tube while maintaining the temperature condition, and at least two heating steps are required.

According to the third aspect of the present invention, in the first or second aspect, the length of a surface of the sealing metal plate is equal to or more half of the peripheral length of an inner peripheral surface in an end portion of the material tube when viewed from a direction along a central axis of the end portion of the material tube.

According to the third aspect of the present invention, the length of the surface of the sealing metal plate is equal to or more than half of the peripheral length of the inner peripheral surface in the end portion of the material tube when viewed from a direction along a central axis of the end portion of the material tube. Therefore, in the forging step, when the end portion of the material tube is crushed in the radial direction to be formed into the connecting plate, the sealing metal plate can be reliably spread over the entire area between the set of inner surfaces without any gap when viewed from the direction along the central axis.

According to the fourth aspect of the present invention, in any one of the first to third aspects, in the forging step, the sealing metal plate is compressed and deformed in a thickness direction to be formed into a sealing material having a thickness of 1/15 to 1/3 of a thickness of the sealing metal plate.

According to the fourth aspect of the present invention, it is possible to reliably suppress the opening of the pores communicating with the inside of the main body bar at the end surface of the connecting plate while maintaining a size of the connecting plate at the same level as at the current connecting plate.

Advantageous Effects of Invention

According to the method for manufacturing the stabilizer according to the above aspect of the present invention, it is possible to suppress the opening of the pores communicating with the inside of the main body bar on the end surface of the connecting plate while maintaining workability and a size of the connecting plate at the same level as at the current connecting plate.

DESCRIPTION OF EMBODIMENTS

Figure 1:
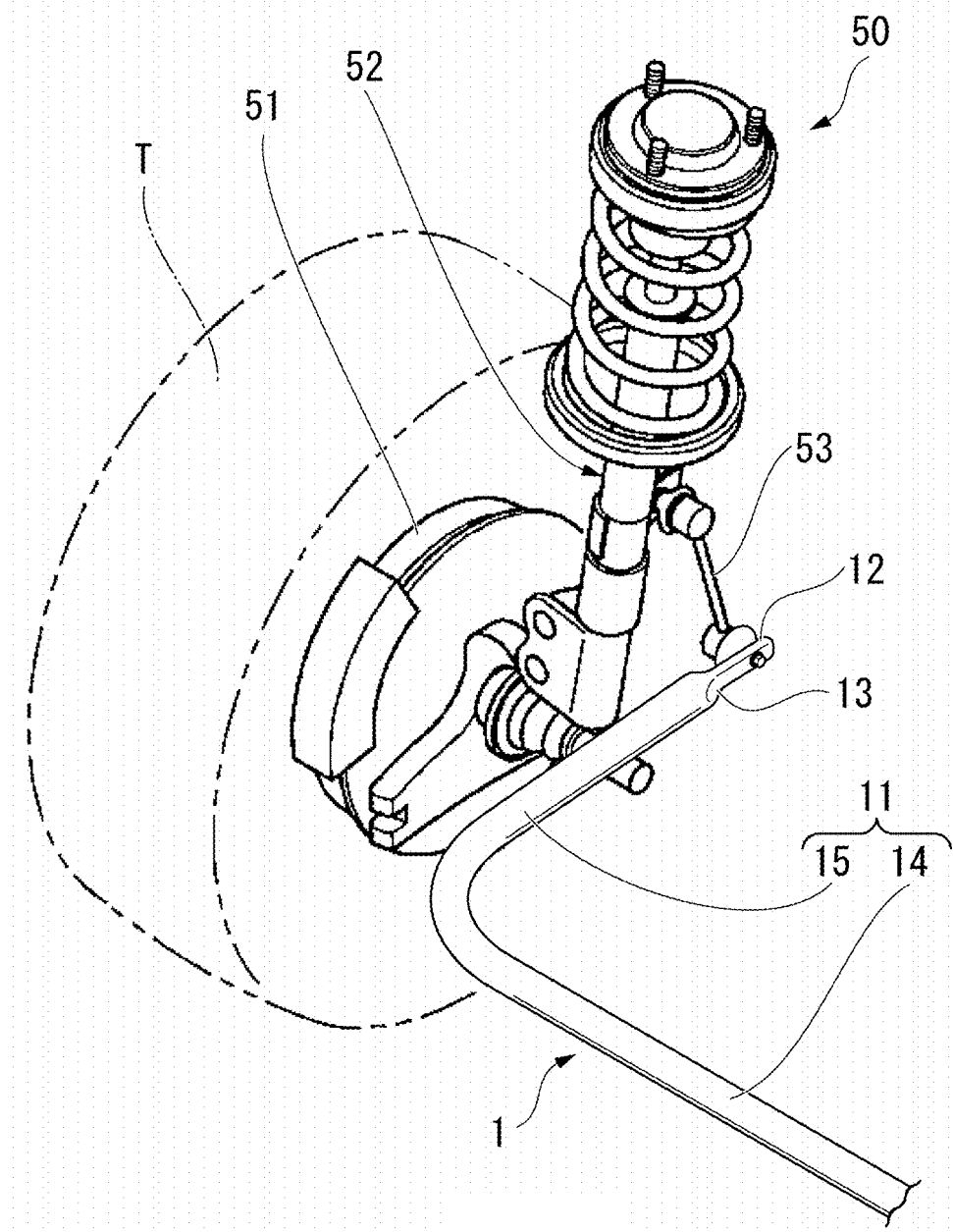
FIG. 1 is a perspective view showing a state in which the stabilizer obtained by the method for manufacturing the stabilizer shown as an embodiment according to the present invention is mounted on a suspension device.

Hereinafter, an embodiment of the stabilizer according to the present invention will be described with reference to FIG. 1 to FIG. 4.

A stabilizer 1 of the present embodiment includes a main body bar 11, a connecting plate 12, and a transition portion 13, and connects a pair of left and right suspension devices 50 to each other. The main body bar 11, the connecting plate 12, and the transition portion 13 are integrally formed. The main body bar 11, the connecting plate 12, and the transition portion 13 are formed of, for example, carbon steel.

First, the suspension device 50 will be described.

The suspension device 50 includes a supporting portion 51 rotatably supporting a wheel T, a shock absorber 52 having a cylinder in which a lower end portion is attached to the supporting portion 51, and a stabilizer link 53 connecting the cylinder of the shock absorber 52 and the stabilizer 1.

Hereinafter, the stabilizer 1 will be described based on the posture of the stabilizer 1 in a state of being attached to the suspension device 50.

The main body bar 11 includes a torsion portion 14 extending in a right and left direction of a vehicle, and a pair of arm portions 15 separately extending from both end portions in the right and left direction of the torsion portion 14 toward the rear of the vehicle, and is formed so as to be elastically deformable. The main body bar 11 is formed in a tube shape.

The length of the torsion portion 14 is longer than the length of the arm portion 15. An outer peripheral surface of the torsion portion 14 extends straight in the right and left direction over the entire length in the right and left direction. The outer peripheral surface of the arm portion 15 extends straight in a front and rear direction over the entire length in the front and rear direction. The inner diameter and the outer diameter of the torsion portion 14 are the same over the entire length. The inner diameter and the outer diameter of the arm portion 15 are the same over the entire length. Each of the inner diameter and outer diameter of the torsion portion 14 is the same as the inner diameter and outer diameter of the arm portion 15. A connecting portion between the torsion portion 14 and the arm portion 15 is bent so as to protrude outward in the right and left direction.

The length of the torsion portion 14 may be equal to or lower than the length of the arm portion 15. The torsion portion 14 and the arm portion 15 may be curved. Each of the inner diameters of the torsion portion 14 and the arm portion 15 may be different from each other, and each of the outer diameters of the torsion portion 14 and the arm portion 15 may be different from each other.

The connecting plate 12 protrudes straight from the arm portion 15 side of the main body bar 11 toward the rear. The connecting plate 12 may protrude from the arm portion 15 side of the main body bar 11 in a bent state toward the rear. The front and back surfaces of the connecting plate 12 are formed in a plate shape facing the right and left direction of the vehicle. That is, a plate thickness direction of the connecting plate 12 coincides with the right and left direction of the vehicle in a state where the stabilizer 1 is attached to the suspension device 50.

The connecting plate 12 is formed with a through hole 12a penetrating in the plate thickness direction. The connecting plate 12 is connected to the stabilizer link 53 by screwing a nut into a bolt in a state where the bolt is integrally inserted into the through hole 12a and the through hole formed in the stabilizer link 53.

Figure 3:
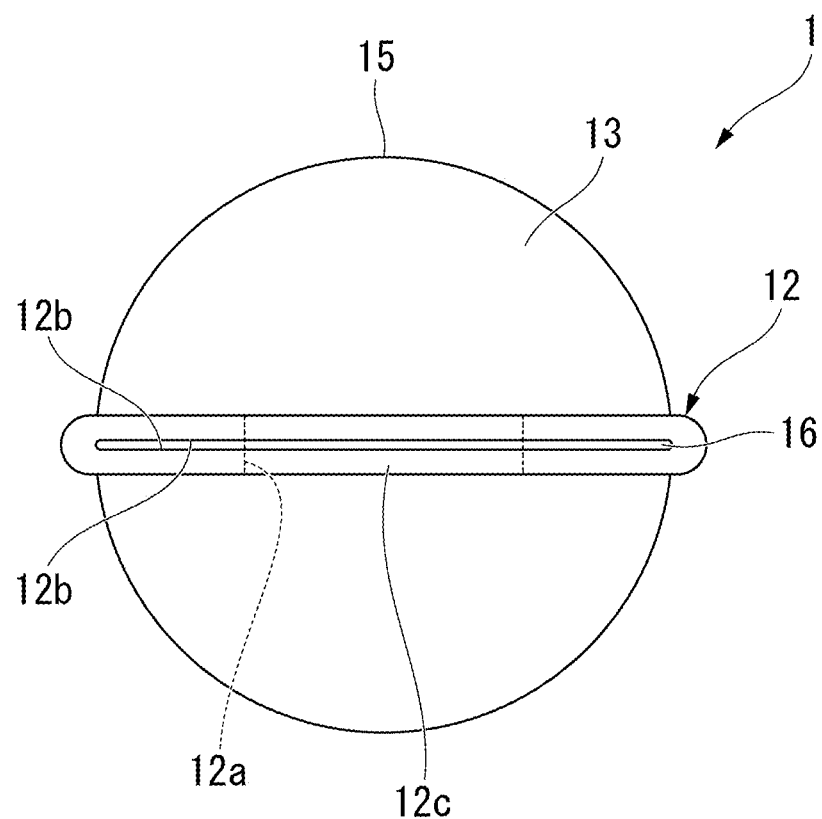
FIG. 3 is a view of a rear end surface of the connecting plate of the stabilizer shown in FIG. 1 as viewed from the rear.

In the forging step, the connecting plate 12 is formed by crushing the end portion of the material tube W in the radial direction and forming the inner peripheral surface of the material tube W so as to have a set of flat inner surfaces 12b, as shown in FIG. 3. The rear end edge of the set of the inner surfaces 12b is exposed on a rear end surface 12c of the connecting plate 12. When viewed from the rear, the rear end surface 12c of the connecting plate 12 has a rectangular shape that is long in the up and down direction, and the set of the inner surfaces 12b extends in the up and down direction.

Figure 2:
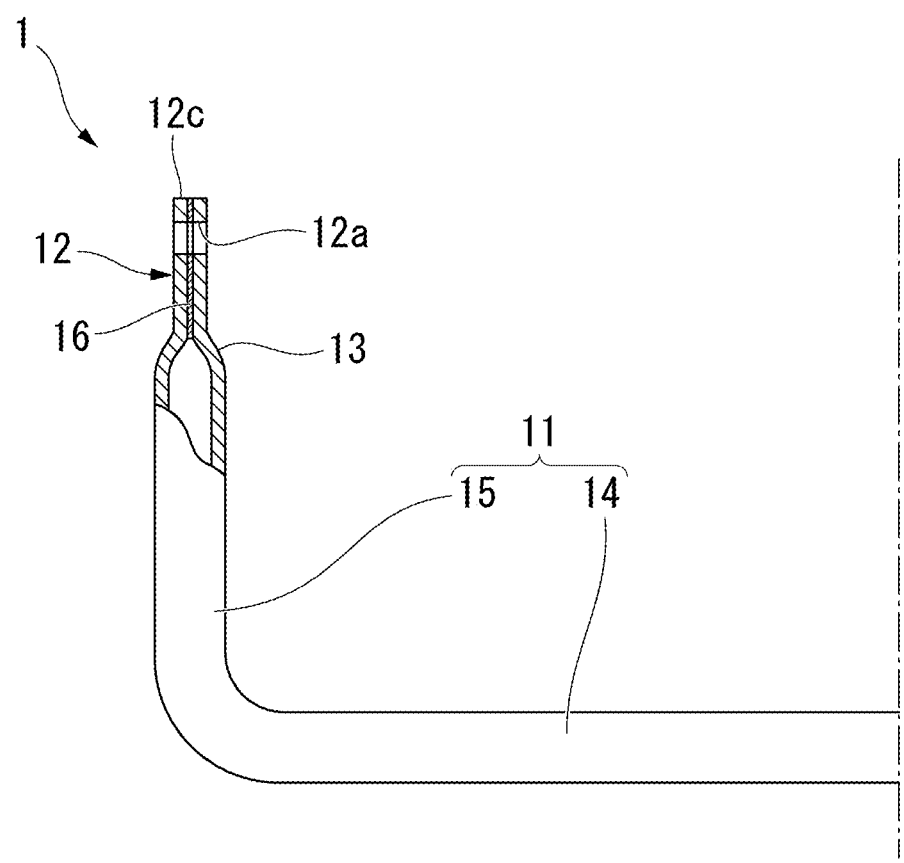
FIG. 2 is a plan view of the stabilizer shown in FIG. 1 as viewed from an up and down direction, including a partial cross-section.

As shown in FIG. 1 and FIG. 2, the transition portion 13 connects a rear end portion of the arm portion 15 of the main body bar 11 and a front end portion of the connecting plate 12, and a size of the connecting plate 12 in the plate thickness direction gradually decreases from the front toward the rear. The transition portion 13 is provided with an internal space communicating with the inside of the main body bar 11. A size of the internal space in the plate thickness direction gradually decreases from the front to the rear. A front end portion of the internal space of the transition portion 13 is connected to the inside of the rear end portion of the arm portion 15 without a level difference.

Central portions of each of the arm portion 15, the transition portion 13, and the connecting plate 12 in the plate thickness direction coincide with each other.

In the above configuration, the stabilizer 1 elastically deforms when displacement amounts of a pair of left and right shock absorbers 52 are different, such as when the vehicle is turning, thereby suppressing a displacement of the vehicle in a roll direction.

Then, in the present embodiment, the stabilizer 1 includes a sealing material 16 arranged between the set of flat inner surfaces 12b in the connecting plate 12. The sealing material 16 is formed in a flat plate shape and is arranged between the set of inner surfaces 12b in the connecting plate 12 without gaps over the entire area in the front and rear direction and the up and down direction. The sealing material 16 is exposed on the rear end surface 12c of the connecting plate 12. A thickness of the sealing material 16 is thinner than a thickness of the connecting plate 12.

The sealing material 16 is made of, for example, aluminum, copper, carbon steel, titanium, or the like. A melting point of a material forming the sealing material 16 is lower than a melting point of a material forming the main body bar 11, the connecting plate 12, and the transition portion 13.

Next, a method for manufacturing the stabilizer 1 configured as described above will be described.

First, the entire material tube W extending straight is heated to a temperature less than an A1 transformation point and bent to form the torsion portion 14. Next, the entire material tube W is heated to a temperature equal to or higher than the A1 transformation point and lower than the melting point by, for example, resistance heating, thereby performing quenching. After that, both end portions of the material tube W are forged to form the connecting plate 12 (forging step). The transition portion 13 is formed by deforming the material tube W following the forming of the connecting plate 12 by forging.

Figure 4:
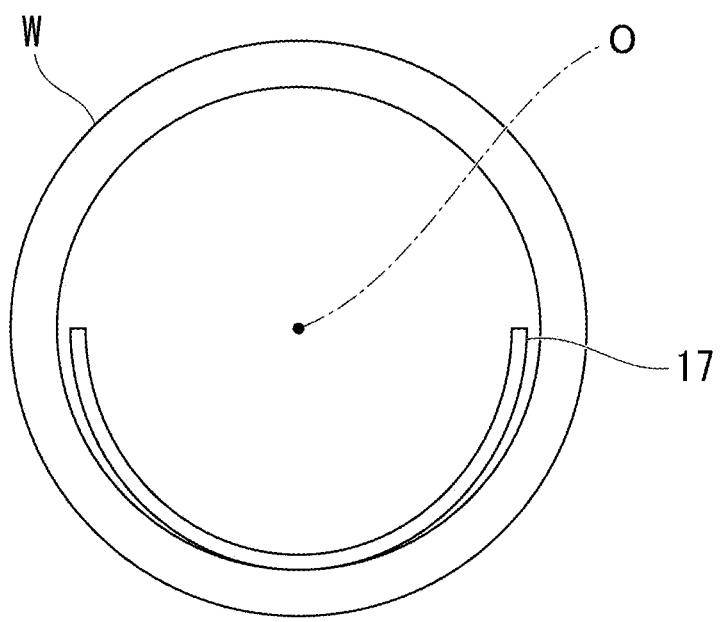
FIG. 4 is a view of a state in which a sealing metal plate is disposed inside an end portion of a material tube, as viewed from a direction along a central axis of the end portion of the material tube.

In the forging step, the sealing metal plate 17 is disposed inside both end portions of the material tube W, and the sealing metal plate 17 is formed into the sealing material 16 by following the forming of the connecting plate 12 by forging. At this time, as shown in FIG. 4, the sealing metal plate 17 is disposed inside both end portions of the material tube W such that a thickness direction of the sealing metal plate 17 at the central portion coincides with a direction in which the end portion of the material tube W is crushed in the radial direction when viewed from the direction along the central axis O of the end portion of the material tube W. In addition, the sealing metal plate 17 is disposed inside the end portion of the material tube W in a state where the part of the sealing metal plate 17 is protruded outside the material tube W.

In the present embodiment, the sealing metal plate 17 is formed in a plate shape curved in an arc shape when viewed from the direction along the central axis O. The sealing metal plate 17 has a single arc shape when viewed from the direction along the central axis O. A radius of curvature of the outer peripheral surface of the sealing metal plate 17 is smaller than a radius of curvature of the inner peripheral surface of the end portion of the material tube W when viewed from the direction along the central axis O. The peripheral length of the outer peripheral surface of the sealing metal plate 17 is equal to or more than half of a peripheral length of the inner peripheral surface in the end portion of the material tube W when viewed from the direction along the central axis O.

A thickness of the sealing metal plate 17 is 3 times or more and 15 times or less of the thickness of the sealing material 16. That is, in the forging step, the sealing metal plate 17 is compressed and deformed in the thickness direction to be formed into the sealing material 16 having a thickness of $\frac{1}{15}$ to $\frac{1}{3}$ of the thickness of the sealing metal plate 17.

In a case where the thickness of the sealing metal plate 17 is less than 3 times the thickness of the sealing material 16, a gap or the like may occur between the set of inner surfaces 12b in the connecting plate 12 and the sealing material 16, thereby preventing complete sealing. In a case where the thickness of the sealing metal plate 17 exceeds 15 times the thickness of the sealing material 16, a width of the connecting plate 12 may become too wide and the stabilizer 1 may not be able to be assembled to the suspension device 50.

In the forging step described above, before the connecting plate 12 and the sealing material 16 are formed, both end portions of the material tube W and the sealing metal plate 17 are integrally heated at the temperature lower than the melting point of the material of the material tube W and equal to or higher than the melting point of the material of the sealing metal plate 17 in a state where the sealing metal plate 17 is disposed inside both end portions of the material tube W. Thereafter, in a state where a sealing metal plate 17 heated to the temperature equal to or higher than the melting point is disposed inside both end portions of the material tube W heated to the temperature lower than the melting point, both end portions of the material tube W are crushed in the radial direction to be formed into the connecting plate 12, and the sealing metal plate 17 is formed into the sealing material 16 by following the formation of the connecting plate 12.

Here, in the forging step described above, when both end portions of the material tube W and the sealing metal plate 17 are heated, a set temperature of a heating device is set to be lower than the melting point of the material of the material tube W and equal to or higher than the melting point of the material of the sealing metal plate 17 in a state where the sealing metal plate 17 is disposed inside both end portions of the material tube W. Therefore, the entire both end portions of the material tube W is lower than the melting point of the material of the material tube W, and at least part of the sealing metal plate 17 is equal to or higher than the melting point of the material of the sealing metal plate 17.

Next, the through hole 12a penetrating integrally are formed in the connecting plate 12 and the sealing material 16, or the connecting plate 12 is cut to have a desired shape.

As described above, according to the method for manufacturing the stabilizer 1 according to the present embodiment, in the forging step, both end portions of the material tube W are crushed in the radial direction to be formed into the connecting plate 12 in a state where the sealing metal plate 17 heated to the temperature equal to or higher than the melting point is disposed inside both end portions of the material tube W. Therefore, the sealing metal plate 17 is likely to extend in a direction orthogonal to the direction in which the end portion of the material tube W is crushed in the forging step when viewed from the direction along the central axis O. Accordingly, in the forging step, when the end portion of the material tube W is crushed in the radial direction, the sealing metal plate 17 can be spread over the entire area between the set of flat inner surfaces 12b that the inner peripheral surface of the end portion of the material tube W has. As a result, it is possible to reliably suppress the opening of the pores communicating with the inside of the main body bar 11 on the rear end surface 12c of the connecting plate 12.

The insert material disposed in both end portions of the material tube W in the forging step is a sealing metal plate 17, which is the metal plate material. Therefore, in combination with the fact that the plate material is softened by being heated to the temperature equal to or higher than the melting point, it is possible to greatly reduce the pressing force required for forming the end portion of the material tube W into the connecting plate 12 as compared with the case where the cylindrical insert material is fitted into both end portions of the material tube as in the conventional case, thereby preventing the deterioration of workability.

A flat plate-shaped sealing material 16 formed by forming the sealing metal plate 17 is arranged between the set of flat inner surfaces 12b in the connecting plate 12. Therefore, it is possible to reliably prevent the connecting plate 12 from being deformed such that the set of inner surfaces 12b is separated from each other in a post-step such as drilling of the connecting plate 12 after the forging step.

In addition, the melting point of the material of the material tube W is higher than the melting point of the material of the sealing metal plate 17. Therefore, in the forging step, both end portions of the material tube W and the sealing metal plate 17 are integrally heated in a state where the sealing metal plate 17 is disposed inside both end portions of the material tube W. In this way, the temperature of both end portions of the material tube W can be made lower than the melting point, and the temperature of the sealing metal plate 17 can be made equal to or higher than the melting point, thereby enhancing the manufacturing efficiency.

In addition, the peripheral length of the outer peripheral surface of the sealing metal plate 17 is equal to or more than half of a peripheral length of the inner peripheral surface in the end portion of the material tube W when viewed from the direction along the central axis. Therefore, in the forging step, when the end portion of the material tube W is crushed in the radial direction to be formed into the connecting plate 12, the sealing metal plate 17 can be reliably spread over the entire area between the set of inner surfaces 12b without any gap when viewed from the direction along the central axis.

The radius of curvature of the outer peripheral surface of the sealing metal plate 17 is smaller than a radius of curvature of the inner peripheral surface of both end portions of the material tube W when viewed from the direction along the central axis O. Therefore, when the sealing metal plate 17 is disposed inside the end portion of the material tube W, a gap is provided between the outer peripheral surface of at least the end portion in the circumferential direction of the sealing metal plate 17 and the inner peripheral surface of the end portion of the material tube W. Accordingly, the sealing metal plate 17 can be easily inserted inside both end portions of the material tube W.

In the forging step, the sealing metal plate 17 is compressed and deformed in the thickness direction to be formed into the sealing material 16 having a thickness of $\frac{1}{15}$ to $\frac{1}{3}$ of the thickness of the sealing metal plate 17. Therefore, it is possible to reliably suppress the opening of the pores communicating with the inside of the main body bar 11 at the rear end surface 12c of the connecting plate 12 while maintaining a size of the connecting plate 12 at the same level as at the current one.

The technical scope of the present invention is not limited to the above-described embodiment, and various modifications can be made without departing from the scope of the present invention defined in the claims.

For example, the above-described embodiment shows a configuration in which the melting point of the material forming the sealing metal plate 17 is lower than the melting point of the material forming the material tube W, but the melting point of the former may be equal to or higher than the melting point of the latter.

In this case, for example, in the forging step, first, the sealing metal plate 17 is heated in advance to a temperature higher than at least a temperature of both end portions of the material tube W. Next, while maintaining this temperature state, the sealing metal plate 17 is disposed in both end portions of the material tube W, and both end portions of the material tube W and the sealing metal plate 17 are integrally heated. In this way, the temperature of both end portions of the material tube W can be made lower than the melting point, and the temperature of the sealing metal plate 17 can be made equal to or higher than the melting point.

The radius of curvature of the outer peripheral surface of the sealing metal plate 17 may be equal to or greater than the radius of curvature of the inner peripheral surface of the end portion of the material tube W when viewed from the direction along the central axis O.

In this case, by uniformly abutting the outer peripheral surface of the sealing metal plate 17 on the inner peripheral surface of the end portion of the material tube W, it is possible to prevent the temperature distribution from occurring on the sealing metal plate 17 and the inner peripheral surface of the end portion of the material tube W, for example. Therefore, the sealing material 16 can accurately form the stabilizer 1 arranged between the set of inner surfaces 12b in the connecting plate 12 without any gap over the entire area.

The sealing metal plate 17 may be formed in a flat plate shape, may have a waveform shape, for example, when viewed from the direction along the central axis O, may have a semicircular shape in which a plurality of circular arcs having different radius of curvature are connected, and may be appropriately changed in shape. In such a configuration, the length of the surface of the sealing metal plate 17 may be equal to or more than half of the peripheral length of the inner peripheral surface at the end portion of the material tube W when viewed from the direction along the central axis O.

The peripheral length of the outer peripheral surface of the sealing metal plate 17 may be less than half of a peripheral length of the inner peripheral surface in the end portion of the material tube W when viewed from the direction along the central axis O.

In the forging step, the entire sealing metal plate 17 may be disposed inside the end portion of the material tube W without protruding a part of the sealing metal plate 17 outside the material tube W.

The connecting plate 12 may protrude in the right and left direction from the arm portion 15 side of the main body bar 11, and the stabilizer configuration may be appropriately changed.

The above embodiment shows a configuration in which the sealing material 16 is arranged between the set of inner surfaces 12b in the connecting plate 12 without any gap over the entire area of each of the front and rear direction and the up and down direction. However, as long as the pores communicating with the inside of the main body bar 11 are not opened on the rear end surface 12c of the connecting plate 12, a gap may be provided in a part between the sealing material 16 and the set of inner surfaces 12b in the connecting plate 12.

In addition, it is possible to replace the components in the above-described embodiment with known components without departing from the scope of the present invention defined in the claims, and the above-described modification examples may be combined appropriately.

INDUSTRIAL APPLICABILITY

According to the method for manufacturing the stabilizer according to the embodiment of the present invention, it is possible to suppress the opening of the pores communicating with the inside of the main body bar on the end surface of the connecting plate while maintaining workability and a size of the connecting plate at the same level as at the current one.

REFERENCE SIGNS LIST

1: Stabilizer
11: Main body bar
12: Connecting plate
17: Sealing metal plate
50: Suspension device
O: Central axis
W: Material tube

What is claimed is:

1. A method for manufacturing a stabilizer, the stabilizer including:
a main body bar that is elastically deformable
a pair of connecting plates that are configured to be separately connected to a pair of left and right suspension devices;
a pair of transition portions that connect both end portions of the main body bar and the pair of the connecting plates; and
a sealing material that is arranged in each of the pair of the connecting plates;
the method comprising:
a forging step of forming the connecting plate by forging both end portions of a material tube, wherein
the forging step includes:
a first step of disposing a sealing metal plate inside both end portions of the material tube;
a second step of integrally heating the both end portions of the material tube and the sealing metal plate at a temperature lower than a melting point of a material of the material tube and equal to or higher than a melting point of a material of the sealing metal plate in a state where the sealing metal plate is disposed inside the both end portions of the material tube,
a third step of crushing the both end portions of the material tube in a radial direction to form the both end portions of the material tube into the pair of connecting plates and form a portion of the material tube other than the both end portions of the material tube into the main body bar and the pair of transition portions in a state where the heated sealing metal plate remains disposed between the both end portions of the heated material tube, and
a fourth step of compressing and deforming the sealing metal plate in a thickness direction to form the sealing metal plate into a sealing material by following the third step, and
the melting point of the material of the material tube is higher than the melting point of the material of the sealing metal plate.

2. The method for manufacturing the stabilizer according to claim 1, wherein
a length of a surface of the sealing metal plate is equal to or more than half of a peripheral length of an inner peripheral surface in the both end portions of the material tube when viewed from a direction along a central axis of the both end portions of the material tube.

3. The method for manufacturing the stabilizer according to claim 2, wherein
the forging step includes:
the fourth step of compressing and deforming the sealing metal plate in the thickness direction to form the sealing metal plate into the sealing material having a thickness of $1/15$ to $1/3$ of a thickness of the sealing metal plate.

4. The method for manufacturing the stabilizer according to claim 1, wherein
the forging step includes:
the fourth step of compressing and deforming the sealing metal plate in the thickness direction to form the sealing metal plate into the sealing material having a thickness of $1/15$ to $1/3$ of a thickness of the sealing metal plate.

5. The method for manufacturing the stabilizer according to claim 1, wherein a length of a surface of the sealing metal plate is equal to or more than half of a peripheral length of an inner peripheral surface in the both end portions of the material tube when viewed from a direction along a central axis of the both end portions of the material tube.

6. The method for manufacturing the stabilizer according to claim 5, wherein
the forging step includes:
the fourth step of compressing and deforming the sealing metal plate in the thickness direction to form the sealing metal plate into the sealing material having a thickness of $1/15$ to $1/3$ of a thickness of the sealing metal plate.

7. The method for manufacturing the stabilizer according to claim 1, wherein
the forging step includes:
the fourth step of compressing and deforming the sealing metal plate in the thickness direction to form the sealing metal plate into the sealing material having a thickness of $1/15$ to $1/3$ of a thickness of the sealing metal plate.

\* \* \* \* \*